United States Patent [19]

Wiklund

[11] 4,413,643

[45] Nov. 8, 1983

[54] HOSE-BREAK VALVE

[75] Inventor: Thore K. E. Wiklund, Piteå, Sweden

[73] Assignee: Regioninvest i Norr AB, Lulea, Sweden

[21] Appl. No.: 261,227

[22] PCT Filed: Jul. 4, 1980

[86] PCT No.: PCT/SE80/00185
§ 371 Date: Apr. 22, 1981
§ 102(e) Date: Apr. 22, 1981

[87] PCT Pub. No.: WO82/00185
PCT Pub. Date: Jan. 21, 1982

[51] Int. Cl.³ .............................................. F16K 13/04
[52] U.S. Cl. ..................................... 137/68 R; 137/71; 137/312; 137/458; 137/464
[58] Field of Search ................... 137/67, 68, 71, 312, 137/458, 464

[56] References Cited

U.S. PATENT DOCUMENTS

| 2,608,205 | 8/1952 | Proctor | 137/312 |
| 2,788,794 | 4/1957 | Holinger | 137/71 |
| 3,104,673 | 9/1963 | Kirsch | 137/71 |
| 3,512,556 | 5/1970 | McKhann | 137/71 |

Primary Examiner—Harold W. Weakley
Attorney, Agent, or Firm—Beveridge, DeGrandi and Kline

[57] ABSTRACT

A hose-break valve comprises a valve housing (2) and a sliding gate (1) movable therealong and is connected with a pressure hose (5) which is surrounded by a protective sleeve (14), while defining a space (13) filled with a pressure medium. The sliding gate (1) is under the action of, on the one hand, the pressure medium in said space (13) and, on the other hand, a loading device (17) acting opposite the pressure medium. First and second pressure relieving devices are provided for closing the valve by means of the loading device (17) when the pressure of the pressure medium in said space (13) respectively exceeds an upper limit value and falls short of a lower limit value.

9 Claims, 13 Drawing Figures

HOSE-BREAK VALVE

This invention relates to a hose-break valve for pressure hoses or conduits with a surrounding protective hose or conduit and a pressure medium in a space between the pressure and protective hoses or conduits, said valve having a sliding gate which is movable along a valve housing between an open position and a closed position preventing throughflow through the valve and which is adapted to be actuated by said pressure medium to be held thereby in the open position against the action of a loading device yieldably actuating the sliding gate towards the closed position and adapted to close the valve when the pressure of said pressure medium falls short of a lower limit value, so that the valve will prevent backflow of gas or liquid from an appliance located downstream of the valve upon leakage or break upstream of said valve.

A known hose-break valve of this type is described in the published Swedish patent application 7702588-0 and comprises a movable or displaceable sliding gate which is actuated not only by the pressure medium enclosed between the pressure conduit and the protective sleeve thereof, but also by a spring pressure opposed to the pressure of the pressure medium, the said two pressures maintaining the sliding gate in a position permitting liquid to pass through the valve when the said pressures counterbalance each other, i.e. when they are equal, but displacing the sliding gate in one or the other direction to close the liquid flow through the valve when one or the other pressure exceeds the opposed pressure, for instance upon break of the pressure conduit and/or its protective sleeve. The function of these known hose-break valves is satisfactory, except when pressure surges occur in the pressure conduit or in the pressure medium within the protective sleeve, and when a small leakage occurs in the pressure conduit or in the sleeve. Thus, it was found that such pressure surges upset the spring-balanced position of the sliding gate, and furthermore the effects of the pressure surges are aggravated because the sliding gate is moved out of the balanced open position and partially closes the throughflow through the valve. A small leakage in the pressure conduit or in the sleeve will cause the balanced position of the sliding gate to be displaced in one or the other direction from the open position of the valve, resulting in a partial throttling which may remain over a long period of time until so much pressure medium has leaked out that the valve will be fully closed. Such long-term throttling of the flow through the valve may result in considerable loss of power.

The present invention therefore has for its object to obviate these shortcomings of the prior art hose-break valves operating with a pressure medium to actuate a sliding gate included in the valve. To achieve this object, the hose-break valve of the present invention is characterized by the features stated in the appended claims.

The invention will be described in detail in the following, reference being had to the accompanying drawings in which.

In the embodiment of the present invention shown in FIGS. 1-6, the valve comprises a sliding gate 1 which is slidable on a sleeve 2 forming the valve body or housing and provided at one end with an externally threaded connection 3 for connecting the valve to e.g. a hydraulic cylinder and provided at its other end with an internally threaded connection 4 which, as will appear from the drawings, is connected to a pressure hose 5 by means of a conventional hose coupling 6. The sliding gate 1 which surrounds the valve sleeve 2 with a sliding fit, is sealed against the valve sleeve 2 by means of sealing rings 7 and is provided on its inner side with a circumferential groove 8 having a width at least equal to the outer distance between two rows of holes 10 and 11, respectively, provided in the sleeve 2 on either side of a wall 9 within said sleeve, the holes of each such row having a diameter which makes the total area of the holes of one row larger than the internal cross-sectional area of said sleeve 2.

Figure 1:
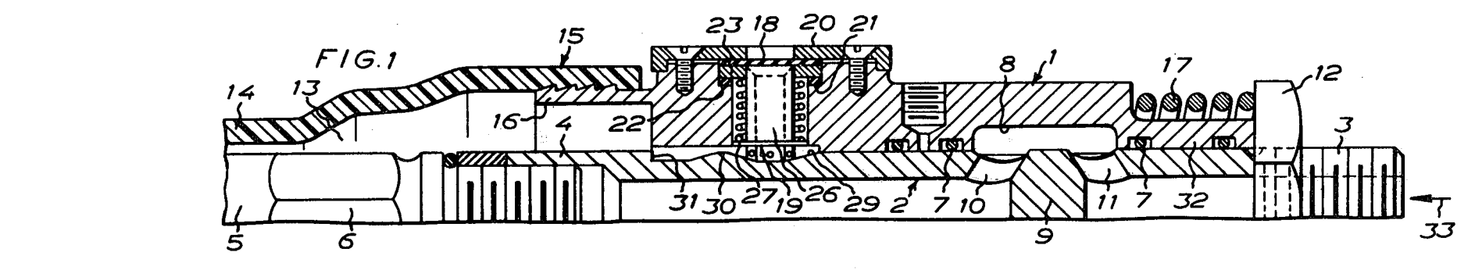
FIG. 1 is a longitudinal section of a portion of a first embodiment of the invention.
Figure 2:
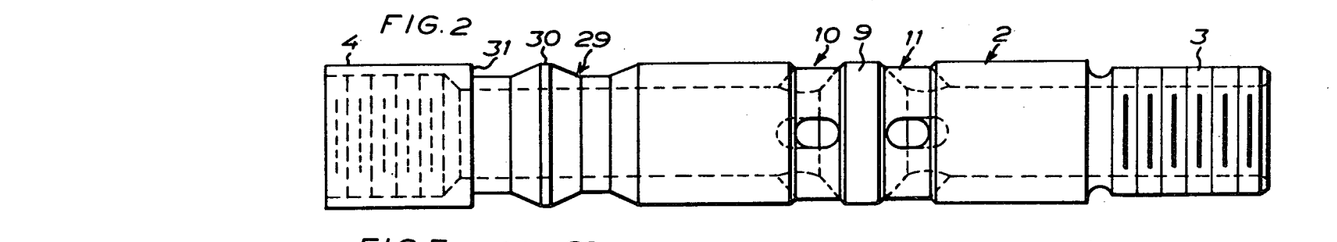
FIG. 2 is a side view of a sleeve forming a valve housing in the first embodiment.
Figure 3:
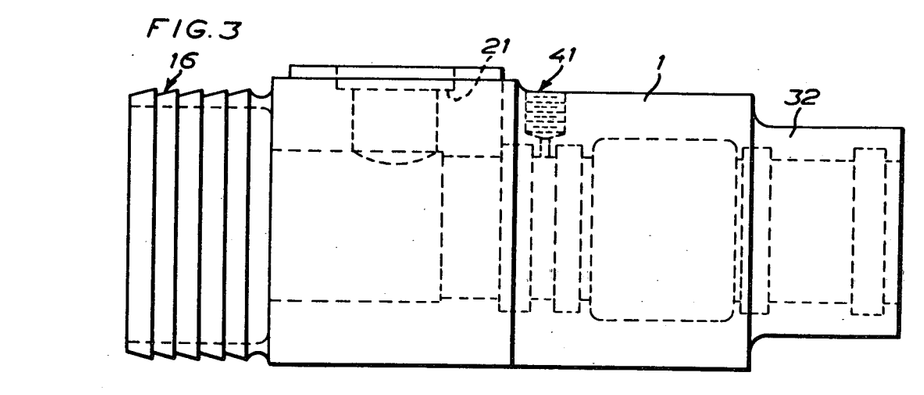
FIG. 3 is a side view of a sliding gate in the first embodiment.

In the position shown in FIG. 1, which is the one end position of the sliding gate and the fully open position of the valve and which is determined by an adjustable abutment 12 which is shown in FIG. 1 in the form of a nut on the threaded connection 3, the groove 8 overlies the two rows of holes 10, 11, thereby enabling pressure medium, such as hydraulic fluid or pressure gas, to flow through the valve in one or the other direction. In this open position of the valve, the sliding gate 1 is held urged against the nut 12 by a pressurized pressure medium, such as a hydraulic fluid, a suitable gas or air, which is enclosed within the space 13 and which is under such a predetermined pressure that the pressure acts on the sliding gate 1 with a force at least equal to and preferably somewhat greater than the force exerted in the opposite direction by a pressure spring 17 mounted between the nut 12 and the sliding gate 1. In this manner, also the sliding gate 1 is held in the end position shown in FIG. 1 and is unable to move to the right in the said Figure upon an increase of the pressure within the space 13 which is formed between the pressure hose 5 and an outer hose 14 surrounding said pressure hose 5 over the entire length thereof, said outer hose 14 being dimensionally stable against at least said predetermined pressure and functioning also as a protection for said pressure hose 5. In FIGS. 1 and 6-8 the pressure hose 5 is shown to be vulcanized with its end 15 to an end socket 16 of the sliding gate 1. The socket 16 preferably is provided with circumferential ridges serrated in cross-section in order to establish an entirely tight connection between the gate and the outer hose. Naturally, such a tight connection between these members can be achieved also in some other manner, for instance by connecting the hose end 15 with the end socket 16 of the sliding gate by means of hose clips 50, as is shown in FIG. 9.

The pressure medium enclosed in the space 13 may be either a liquid or a gas, such as air.

The pressure medium enclosed within the space 13 also acts upon a rubber diaphragm 18 in a release or pressure relieving mechanism 19 disposed within the sliding gate 1. A cover 20 screwed to said sliding gate clamps the rubber diaphragm 18 against a steel washer 23 which is supported by a shoulder 21 in the sliding gate and sealed thereagainst by means of an annular rubber seal 22. The rubber diaphragm 18 is so dimensioned that it withstands at least the pressure required to maintain the valve in the position shown in FIG. 1 against the action of the spring 17, but ruptures at a predetermined pressure increase within the space 13, i.e. when a predetermined upper limit value of the pressure in the space 13 is exceeded. The release mechanism 19 comprises, besides the said diaphragm, a pressure sleeve or tubular punch 26 displaceably mounted in the sliding gate underneath the diaphragm and provided with an external flange 25, said pressure sleeve or punch 26 having an external diameter not greater than the diameter of holes 28 provided both in the steel washer and in the cover and aligned with one another and with said pressure sleeve (see FIG. 5). Furthermore, the pressure sleeve or punch 26 is formed at its end facing the diaphragm 18 with a knife-edge 24. By means of a pressure spring 27 disposed between the steel washer 23 and the flange 25, the pressure sleeve is yieldingly held against a cam surface 29 formed in the valve body 2 and having a crest 30 and an end stop 31 determining the other end position of the sliding gate.

In view hereof, even an insignificant leakage in the pressure hose 5 will cause hydraulic fluid to leak into the space 13, provided that the pressure in the space 13 is lower than the hydraulic pressure in the hose 5, whereby the pressure in said space and thus also on the diaphragm 18 will be increased successively, and this pressure increase will continue until the diaphragm 18 ruptures, the sliding gate 1 being unable to leave the position shown in FIG. 1 during this pressure increase. As a result, the pressure in the space 13 drops and the sliding gate 1 is rapidly moved by the pressure spring 17 into its other end position determined by the end stop 31 and the pressure sleeve 26. In this position, the sliding gate portion 32 overlies the holes 11 with its seals 7 sealing against the valve body 2 on either side of said holes which thus are closed, whereby return flow of hydraulic fluid from e.g. a hydraulic cylinder (not shown) in the direction of the arrow 33 is prevented. In this manner, also the cylinder or, rather, its piston is locked in position and unable to move.

If the pressure in the space 13 between the pressure hose 5 and the outer hose 14 should drop more or less slowly, the gate 1 will be urged by the pressure spring 17 to the left with respect to FIG. 1. Regardless of whether the sliding gate 1 moves slowly or rapidly from the end position shown in FIG. 1 into the other end position, the pressure sleeve 26 will be displaced radially outwardly by the cam 29 of the valve housing or body so that the knife-edge 24 of the pressure sleeve cuts or punches a hole in the diaphragm 18, thereby causing the pressure in the space 13 to drop more rapidly and thus the valve to close instantaneously every time this is required. It will be realised that the cutting or punching operation effected by the pressure sleeve should take place as quickly as possible after the sliding gate 1 has been set in motion by the pressure spring 17, during which motion the pressure sleeve 26 thus is guided by the cam 29 which, when the pressure sleeve 26 has passed the crest 30, permits the pressure spring 27 to displace the pressure sleeve 26 radially inwardly so that said sleeve can abut the end stop 31 and arrest the sliding gate in its other end position, i.e. the closed position of the valve.

Figure 6:
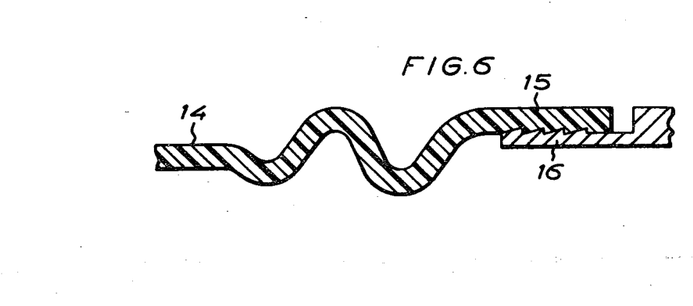
FIG. 6 illustrates a detail of the first embodiment of the invention.

In this other end position, the outer hose 14 shown in FIG. 1 exhibits the wavy shape which is shown in FIG. 6 and which permits an extension of the hose corresponding at least to the distance which the sliding gate has travelled. The outer hose always strives to return to this wavy shape when it has been deformed.

In view hereof, the hose 14 will contribute in moving the sliding gate 1 from the open to the closed position. Furthermore, it is possible, within the scope of the invention, to replace the pressure spring 17 by a tension spring built into the hose 14, or other tensioning member providing for rapid movement of the sliding gate 1 from open to closed position as soon as the pressure in the space 13 drops.

The above described embodiment of the arrangement causes a rapid pressure drop in the space 13, not only when the diaphragm 18 ruptures, but also as soon as a leakage or break occurs in the outer hose 14, and the valve according to the invention will therefore function also in such cases. The pressure drop in this instance does not depend on a rupturing of the diaphragm but on the cutting of a hole in the diaphragm 18 when the pressure in the space 13 has fallen below a predetermined lower limit value and the sliding gate 1 has been moved a given distance towards the closed position. In the event a predetermined, maximally permissible pressure increase in the space 13 is exceeded, the diaphragm will rupture. Such a pressure increase may occur upon leakage or break in the inner hose 5. The hose-break valve according to the present invention will thus function satisfactorily regardless whether only the inner hose, only the outer hose, or both the inner hose and the outer hose should rupture, and also regardless of the sequence of such ruptures.

Figure 4:
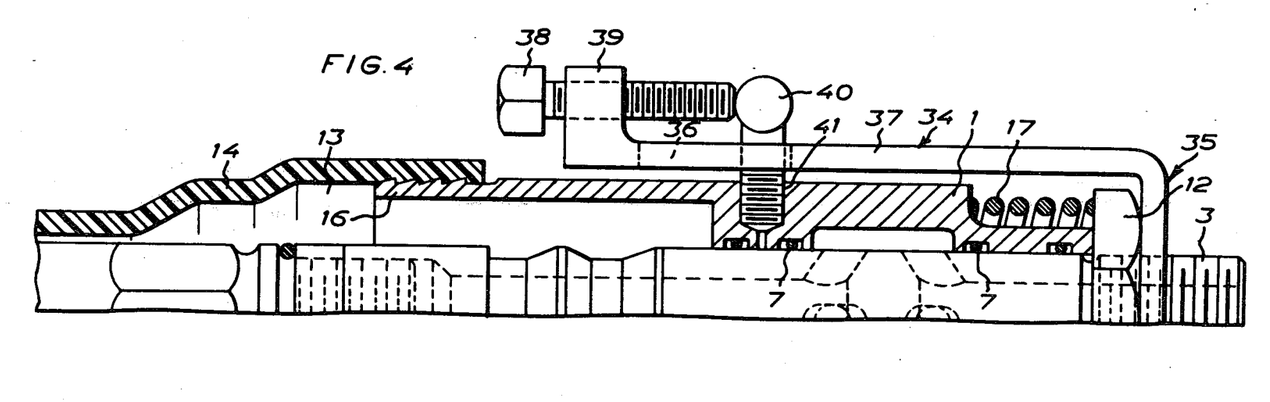
FIG. 4 illustrates a tool attached to the valve for mounting the valve and for emergency release thereof.
Figure 5:
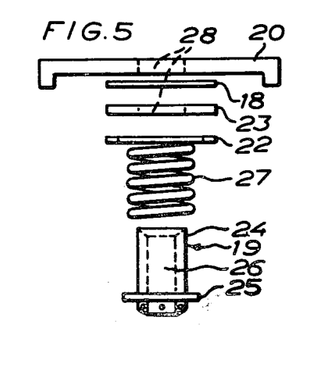
FIG. 5 is an exploded view of the details of a valve releasing or pressure relieving mechanism in the first embodiment.

Should it not be possible to tension the pressure spring 17 and/or the hose 14 by hand when the valve is mounted or after the valve has been released and a new rubber diaphragm 18 has been mounted in the release mechanism 19, the tool illustrated in FIG. 4 can be used. This tool has a fork-shaped end 35, a body 37 having a slot 36, and a portion 39 carrying a set screw 38. The tool is hooked with its fork-shaped end over the valve connection 3 and firmly pulled against the nut 12, whereupon a stop screw 40 extending through the slot 36 is screwed into a threaded hole 41 in the sliding gate 1 which can then be moved into its end position by means of the set screw 38 opposite the stop screw 40, while tensioning the pressure spring 17 and/or the hose, and/or other tensioning member which may be built into the hose, whereupon pressure medium is introduced into the space 13 until the pressure required for maintaining the sliding gate in its position abutting the nut 12 has been reached. The tool may be used also for emergency release of the valve. To enable the tool to be mounted in different positions on the valve, a numer of holes should be provided around the periphery of the sliding gate 1.

Figure 7:
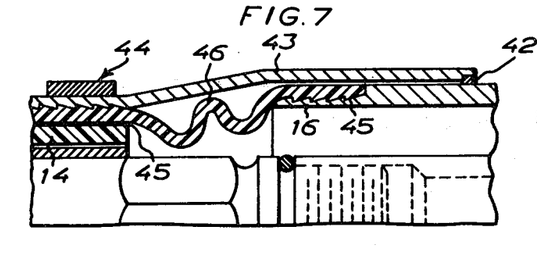
FIGS. 7 and 8 illustrate alternative embodiments of the connection of the valve sliding gate to a protective sleeve surrounding the pressure conduit.

FIG. 7 shows an alternative embodiment of the connection of the outer hose to the end sleeve 16 of the sliding gate, and this alternative embodiment comprises a sleeve 43 movable relative to said sliding gate 1 and sealed thereagainst by means of a seal 42, said sleeve 43 serving to protect and support a jointing hose 46 which extends between the outer sleeve or hose 14 and the end sleeve 16 of the sliding gate and which, because the sleeve 43 is made for instance of steel, may be essentially thinner and more elastic and flexible than the outer sleeve or hose 14. The jointing hose 46 is vulcanised to the outer sleeve or hose and to the end sleeve 16 at 45, while the sleeve 43 is secured to the jointing hose 46 by means of a clamp 44 or the like.

Figure 8:
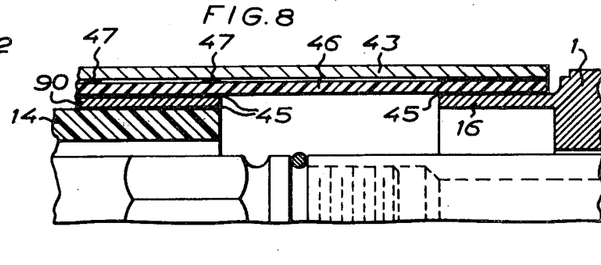
Figure 9:
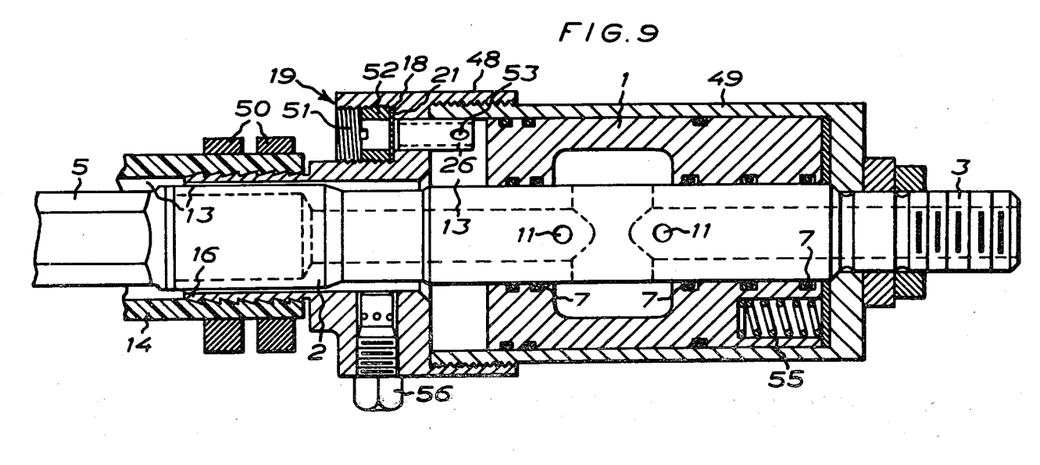
FIG. 9 illustrates a modified embodiment of the valve according to the invention.

Also in the embodiment shown in FIG. 8, the jointing hose 46 is vulcanised to the end sleeve 16 and to the outer hose 14. The embodiment according to FIG. 8 distinguishes over the embodiment shown in FIG. 7 merely in that the jointing hose 46 is vulcanised to an intermediate sleeve 90 which in turn in vulcanised at 45 to the outer hose or sleeve 46, and in that the sleeve 43 is fixedly connected at its end facing the valve with the jointing hose 46, but is movable relative to said jointing hose at its other end which is sealed against the jointing hose by means of seals 47. FIG. 8 shows the jointing hose in the open position of the valve, while FIG. 7 shows the jointing hose 46 in the closed position of the valve.

The embodiment shown in FIG. 9 illustrates that it is also possible to dispose the sliding gate 1 movable within a steel casing comprising two portions 48, 49 of which the portion 48 is screwed onto the portion 49. In this embodiment, the rubber diaphragm 18 of the axially disposed release or pressure relieving mechanism 19 is clamped against the shoulder 21 by means of a hollow nut 52 screwed into an opening 51 in the sliding gate 1. The pressure sleeve or punch 26 which in this instance is provided with throughholes 53 for the pressure medium (as is the case also in the embodiment shown in FIG. 5) is here actuated directly by the sliding gate 1. A number of pressure springs 55 are disposed between the portion 49 and the sliding gate 1. The space 13 is supplied with pressure medium through a nipple 56.

The embodiment, illustrated in FIGS. 10-13, of the hose-break valve according to the present invention possesses, like the embodiments previously described, a sliding gate 1 movably mounted on a valve body or housing 2. The arrangement of the circumferential groove 8 of the sliding gate and the sealing rings 7, the rows of holes 10, 11 and the wall 9 of the valve housing is the same as in the embodiments previously described, except that the wall 9 also has a circumferential groove accommodating a sealing ring 60. The sealing ring 60 seals against the inner side of the sliding gate portion 32 when the valve is in the closed position. The valve housing has a narrower portion 62 with a bevelled face 63 at the end adjacent the row of holes 11. The sliding gate 1 has at its end a corresponding inwardly directed, bevelled flange 64 which, when the sliding gate 1 is moved to the left with respect to FIG. 10, will engage the bevelled face 63 which serves as a stop when the valve is fully closed.

Figure 10:
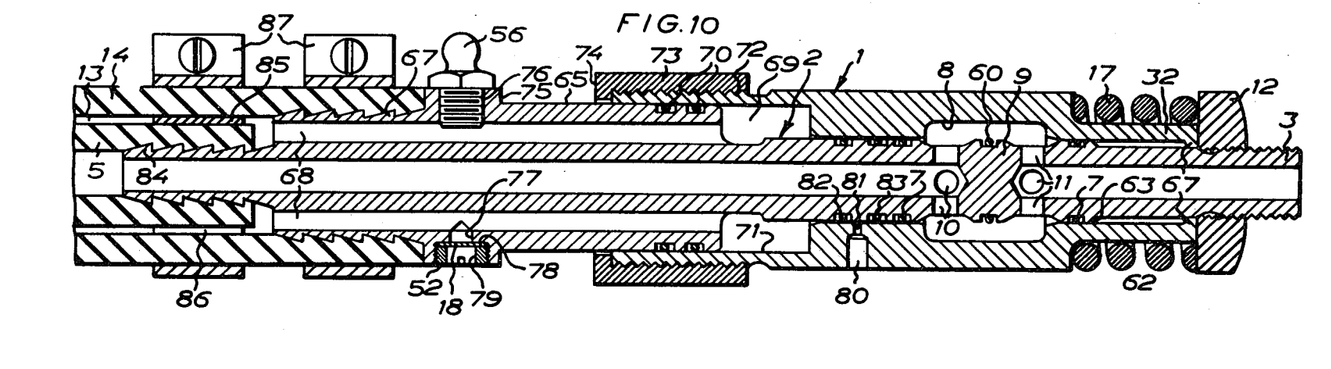
FIG. 10 illustrates a longitudinal section of another embodiment of the present valve in open position.
Figure 11:
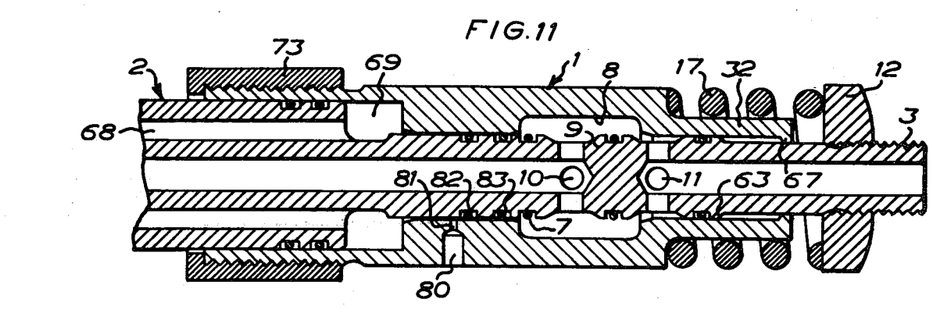
FIG. 11 illustrates a longitudinal section of a part of the valve of FIG. 10 in a partially closed position.
Figure 12:
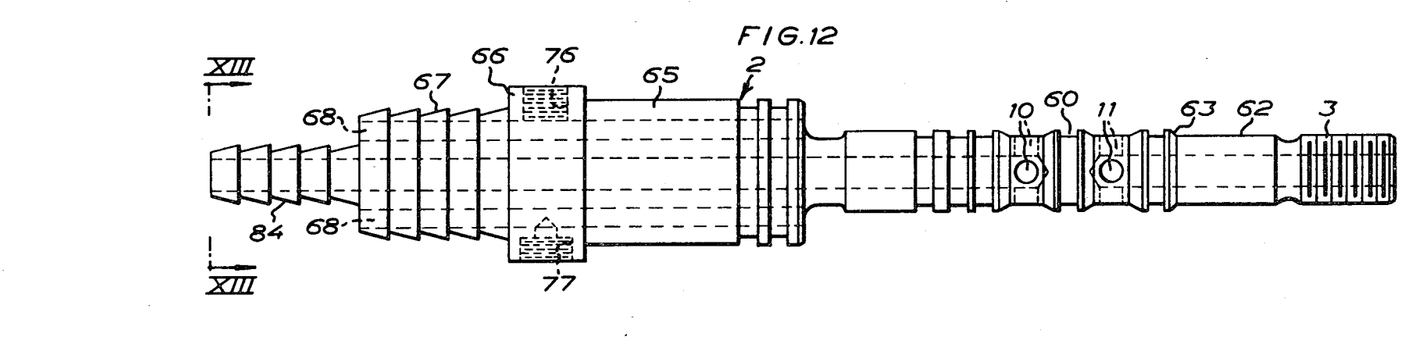
FIGS. 12 and 13 show a side view and an end view, respectively, of a valve housing in the valve shown in FIG. 10.
Figure 13:
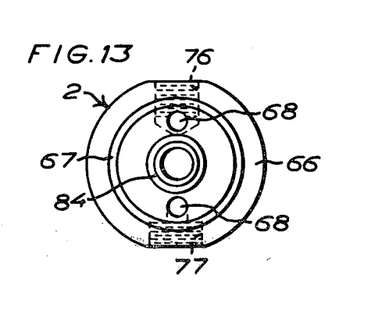

Compared to the embodiments previously described, the valve housing 2 has been extended to the left with respect to FIG. 10 and thus has a cylindrical portion 65, a thicker portion 66 beyond said portion 65, and, beyond said thicker portion 66, a sealing portion 67 for the outer holes 14. Extending through said portions 65, 66 and 67 are two longitudinal bores 68 connecting the space 13 between the hoses 5 and 14 with the inner cavity 69 of the hose-break valve so that the pressure medium within the space 13 can freely flow to the cavity 69 and act directly on the sliding gate to move the latter towards the right against the action of the pressure spring 17 which is clamped between the sliding gate and the nut 12 screwed onto the threaded portion 3 of the valve housing. To seal the cavity 69 against the surroundings, the portion 65 of the valve housing has two sealing rings 70 which are placed in grooves and seal against the inner side of the cylindrical bore provided in the sliding gate 1 and defining the cavity 69.

In the embodiment illustrated, the sliding gate 1 has an external thread 72 with a screwed-on union nut 73, the free end 74 of which is adapted to cooperate with the shoulder 75 between the portions 65 and 66 of the valve housing. In the fully closed position of the valve (determined by the engagement of the inwardly facing flange 64 of the sliding gate with the bevelled face 63 of the valve housing) the surface 74 of the nut 73 normally is a short distance from the shoulder 75. The nut 73 can be utilized for wholly or partly opening the valve by hand, if this should be necessary in the event of a hose-break. By screwing the nut 73 outwards on the threads 72 of the sliding gate 1, the latter can thus be moved to the right with respect to FIG. 10 so that the spring 17 will again be compressed and the inner groove 8 will enable the pressure medium to pass between the rows of holes 10 and 11.

The valve housing 2 shown in FIGS. 10-13 has a filling nipple 56 which is screwed into a threaded hole 76 in the portion 66 and opens into one of the longitudinal bores 68 to permit filling of pressure medium into the space 13. On the opposite side, another bore 77 is provided which opens into the other bore 68 but is provided at its inner end with a circumferential shoulder 78 against which a rupturable diaphragm 18 of elastomer or other suitable material is clamped by means of a nut 52 having a through hole 79. The details 18, 52, 78-79 constitute a first pressure relieving device 19 which is adapted, when the pressure of the pressure medium within the space 13 exceeds a predetermined upper limit value, to relieve the pressure within said space by rupturing the diaphragm 18. The pressure relieving device 19 may also be a safety valve having an adjustable limit value pressure. The essential thing is that, when the pressure of the pressure medium exceeds an upper limit value, the pressure within the space 13 will be relieved so that the spring 17 will move the sliding gate 1 into closed position.

In order to release or close the valve also when the pressure of the pressure medium falls short of a predetermined lower limit value, the embodiment illustrated in FIGS. 10-13 comprises a second pressure relieving device. In the embodiments previously described, this second pressure relieving device is the punch 26 provided with a knife-edge 24 for punching a hole in the diaphragm 18. In the embodiment illustrated in FIGS. 10-13, this second pressure relieving device is formed by a hole 80 which is bored into the sliding gate 1 and has an opening 81 which, when the sliding gate 1 is in the fully open position shown in FIG. 10, lies between two sealing rings 82, 83 on the valve housing 2. The arrangement is such that already a slight lowering of the pressure in the communicating spaces 13, 68, 69 causes the spring 17 to move the sliding gate 1 to the left so that, when the pressure of the pressure medium falls short of the lower limit value, the opening 81 in the sliding gate has moved past the sealing ring 82 for instance into the position shown in FIG. 11. The play between the valve housing 2 and the sliding gate 1 will then cause the pressure medium within the communicating spaces 13, 68, 69 to escape through the opening 81 and the hole 82 so that the pressure within these spaces will be lowered more quickly until the valve is in fully open position. The speed at which the pressure within the spaces 13, 68, 69 is relieved can be determined by varying the relative diameters of the cooperating portions of the housing and the sliding gate.

In the embodiment illustrated in FIG. 10, the connection of the inner and outer hoses 5 and 17, respectively, with the valve housing 2 is somewhat different. Thus, the inner hose 5 has been pushed over a clamping portion 84 on the valve housing, and a slotted intermediate sleeve 85 has been disposed around the hose end so that said sleeve leaves a throughflow portion 86 to establish communication between the spaces 13 and 69. The outer hose 14 has been pushed over the intermediate sleeve and the housing portion 68, whereupon two hose clamps 87 have been mounted for clamping the outer hose against the portion 67 and the inner hose against the portion 84 through the intermediary of the outer hose 14 and the sleeve 85.

In the embodiment illustrated in FIGS. 10-13, the sliding gate 1 may well be made of steel and the valve housing 2 of brass or similar metal having a higher coefficient of linear expansion than the material of the sliding gate 1. As a result of this arrangement, the hose-break valve may be connected with this portion 3 to a metal pipe in e.g. a gas supply system, in which case a fire and the possible destruction of the hoses 13 and 14 will cause the valve to be released so that the sliding gate 1 is moved to closed position, the flange 64 of said sliding gate engaging the bevelled face 63 of the valve housing. If the heat is so intense as to cause destruction of all sealing rings, the higher coefficient of linear expansion of the valve housing will cause the latter to expand into firm and gas-tight engagement with the inner side of the sliding gate 1 so that gas cannot escape from the metal supply pipe connected with the thread 3.

An important advantage of the hose-break valve according to the present invention, as compared with the prior art hose-break valve disclosed by the above-mentioned Swedish published patent application 7702588-0, is that the sliding gate 1 is held in a stable open position because it engages the nut 12 of the valve housing and the end of the valve housing portion 49, respectively, when the loading device or the spring 17 and 55, respectively, are completely compressed. This rigid engagement between the sliding gate and the valve housing in the fully open position of the valve may be utilized for placing the pressure medium within the space 13 under a pressure higher than is necessary for compressing the loaded device 17, 55 so that a certain amount of pressure is kept in reserve for a slow leakage of pressure medium before release of the hose-break valve. Thus, it is not necessary exactly to adapt the pressure of the pressure medium to an incompletely compressed loading device, as is the case in the known hose-break valve disclosed by the above-mentioned Swedish published application. Besides, if such an exact adjustment had been necessary, it would have required constant supervision and topping-up of pressure medium via the nipple 56 to compensate also for unavoidable leakage.

The hose-break valve according to the invention should be mounted at either end of a pressure hose. By connecting the spaces 13 of a group of valves in series with one another, one attains the advantage that all of the valves in the group are closed upon leakage or break in a hose belonging to one valve.

I claim:

1. A hose-break valve for pressure hoses or conduits with a surrounding protective hose or conduit and a pressure medium in a space between the pressure and protective hoses or conduits, comprising, a valve housing, said valve having a flow passage for communicating with a pressure hose or conduit, and a chamber communicating with the space between the pressure and protective hoses or conduits, a sliding gate which is movable along said valve housing between an open position and a closed position, said sliding gate when in its open position permitting throughflow through the flow passage and when in its closed position preventing throughflow through the flow passage, a yieldable loading device for actuating the sliding gate toward its closed position to close the flow passage when the pressure of said pressure medium in said chamber falls short of a lower limit value, actuating means responsive to and actuated by the pressure of said pressure medium in said chamber for actuating the sliding gate toward its open position against the action of the yieldable loading device, said actuating means being independent of and unresponsive to the pressure in said flow passage, a pressure relieving device operable to relieve the pressure in the chamber when such pressure exceeds an upper limit value, said yieldable loading device being operable when said pressure is relieved to move the sliding gate to its closed position.

2. A hose-break valve as claimed in claim 1 wherein the pressure relieving device is operable when pressure is relieved to release pressure to a location which is exterior of the flow passage.

3. A hose-break valve as claimed in claim 1, characterised in that it has a second pressure relieving device which is adapted, when the pressure of the pressure medium in said space (13) falls short of a lower limit value, to relieve this pressure and thereby to cause the loading device (17, 55) to move the sliding gate (1) to closed position.

4. A hose-break valve as claimed in claim 3, characterised in that the second pressure relieving device (80-82) comprises a pressure relieving duct (80) formed in the sliding gate (1) and having its outlet (81) in the sliding gate side facing the valve housing (2), the outlet (81) of said pressure relieving duct (80) being separated from said space (13) in the open position of the valve by means of a seal (82) which is provided on the valve housing (2) in a position determined by the lower limit value of the pressure medium so that, when the pressure of said pressure medium falls short of said lower limit value, communication is established between the pressure relieving duct (80) and the said space (13).

5. A hose-break valve as claimed in claim 1, characterised in that the pressure relieving device (19) comprises a portion (18) which is actuated by the pressure medium and constitutes a weak point in that it has been dimensioned to rupture when the pressure of the pressure medium exceeds the upper limit value, thereby to relieve the pressure within said space (13).

6. A hose-break device as claimed in claim 1 or 5, characterised in that the pressure relieving device (19) comprises a puncturing means (24, 26) which is adapted to be actuated by relative movement between the sliding gate (1) and the valve housing (2) and to puncture a closing member (18) included in the pressure relieving device (19) when the pressure of the pressure medium falls short of the lower limit value.

7. A hose-break valve as claimed in claim 6, characterised in that the puncturing means (24, 26) is provided on the sliding gate (1) and has a cam follower (26) adapted to engage a cam surface (29) formed on the valve housing (2).

8. A hose-break valve as claimed in claim 5, characterised in that said portion (18) actuated by the pressure medium is a diaphragm (18).

9. A hose-break valve as claimed in claim 1, characterised in that it comprises a sliding gate returning device (72-75) acting between the sliding gate (1) and the valve housing (2), to permit manual return of the sliding gate from its closed position into an at least partially open position against the action of the loading device (17).

* * * * *